C. FÉRY.
PENDULUM ELECTRICITY METER.
APPLICATION FILED JAN. 12, 1909.
943,531.
Patented Dec. 14, 1909.
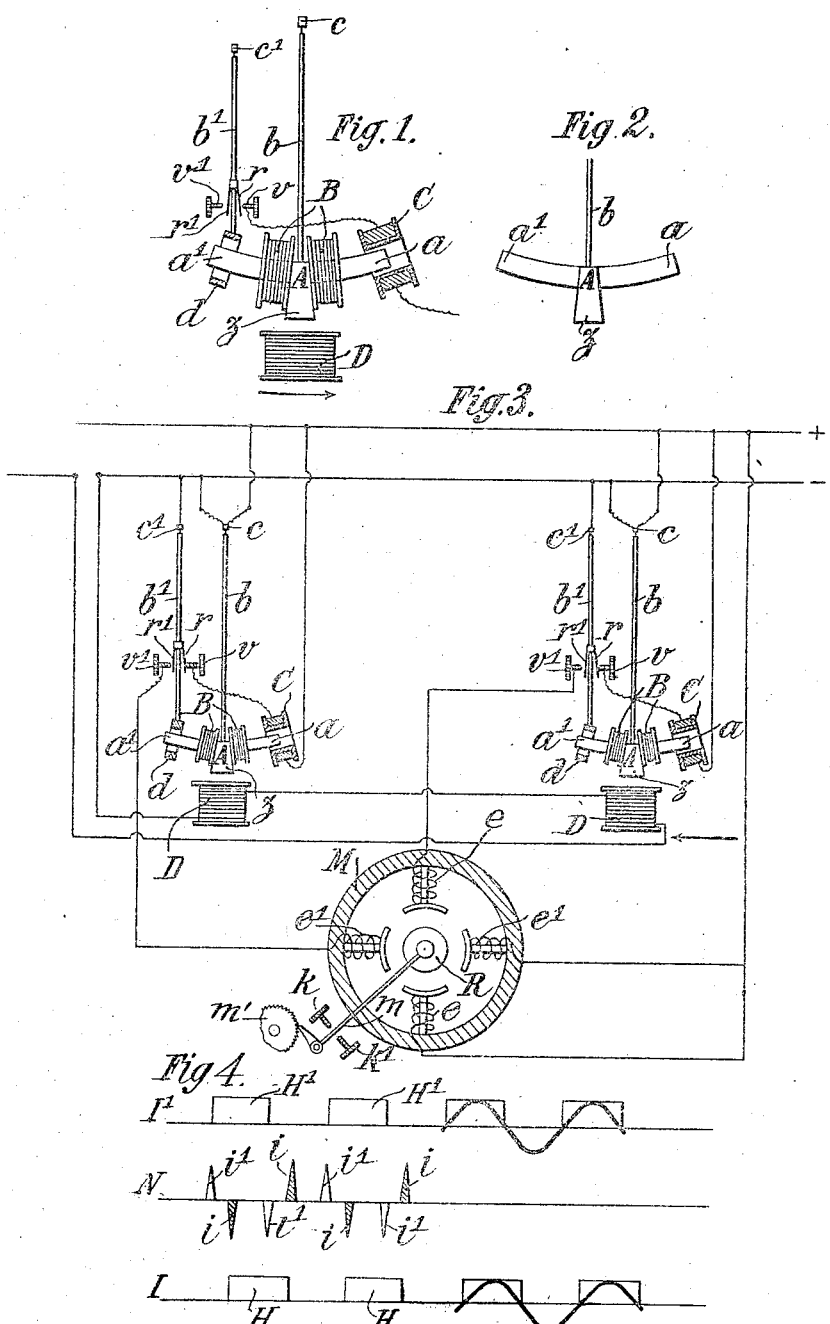

and on the left side.
UNITED STATES PATENT OFFICE.

CHARLES FÉRY, OF PARIS, FRANCE.

PENDULUM ELECTRICITY-METER.

943,531.　　　Specification of Letters Patent.　　Patented Dec. 14, 1909.

Application filed January 12, 1909.　Serial No. 471,983.

*To all whom it may concern:*

Be it known that I, CHARLES FÉRY, a citizen of the Republic of France, residing in Paris, France, have invented certain new and useful Improvements in Pendulum Electricity-Meters, of which the following is a specification.

Pendulum electricity meters which do not require brushes for conducting the current to them, as is the case with motor meters having collectors, have a constancy of working which cannot be attained with motor meters in which unavoidable variations are produced owing to the friction between the brushes and the collector. This general defect of motor meters is particularly apparent when the consumption is small in which case accuracy is comparatively non-existent, if indeed the motor does not actually stop. Assuming that a new motor meter records a fraction of the maximum consumption equal to 1/100 this limit of sensitiveness generally falls to 1/50 at the end of some months, on the other hand pendulum meters have a sensitiveness theoretically infinite and in practice amounting to 1/1000 of the maximum consumption. However, the existing pendulum meters have several defects; in the first place there is the necessity for allowing the meter to operate continuously owing to the uncertainty of its starting again when the circuit is closed. This necessity leads to a danger of fire owing to accidental short circuits during the absence of the consumer; moreover there is a liability to run light which is only imperfectly avoided by the complicated devices for changing over the current at equal intervals of time of the two pendulums which tends to prevent accumulation of small errors of fast or slow which the two pendulums generally have in relation to each other. The second defect resides in the complication of the mechanism which generally comprises a first train of gear actuating by means of a differential two other registering devices which in their turn control the two pendulums governed by an escapement, the differential movement of the wheels of the two pendulums being registered by a differential which actuates a fourth registering device. Moreover the inverting commutator which is operated at equal intervals of time to interchange the two pendulums and to avoid the accumulation of their difference of speed during light running produces a disagreeable noise; this is true also of the escapement and to this noise must be added that of the electric motor which winds up the spring barrel at short intervals of time, say three minutes. The usual anchor escapements which are designed to effect a regular operation of the apparatus, are started by hand. Efforts have been made to obtain an automatic starting in pendulum meters, but up to the present time such efforts have resulted in the creation of other disadvantages affecting the regularity of operation of the pendulum; furthermore, the starting obtained is not sufficiently exact or reliable to permit the suppression of the current in the apparatus during the hours when it is not working, because one cannot be sure that at the moment of restoring the current the apparatus will be automatically started. It must be further remarked that the mechanical escapements require a certain supervision if stoppages due to friction are to be avoided; these stoppages may also be due to the defective operation of the contacts of the electric motor or of the inverting commutator by which relatively strong currents are cut out and which give rise to sparking.

The approved pendulum electricity meter which constitutes the subject matter of this invention has been designed for the purpose of avoiding the aforesaid disadvantages. It comprises essentially:—1. The combination of two electrically controlled pendulums which are automatically started, arranged in such a manner that there is no friction between solid materials during their oscillation. 2. The registration of the coincidences of the two pendulums is obtained by applying the principles employed in the construction of rotary field motors.

The maintenance of the oscillations of the electric pendulums used in the meter is secured in a manner hereinafter described in detail.

In the accompanying drawings, Figure 1 shows a mode of actuating each of the two pendulums of the meter by a magnetic damping device; only one pendulum is shown. Fig. 2 shows a detail of Fig. 1. Fig. 3 shows diagrammatically the two pendulums and the motor and their circuits. Fig. 4 is a diagram of the currents of the apparatus of Fig. 3.

The piece of soft iron A shown separately in Fig. 2 carries two curved lateral rods $a\,a'$, on which are mounted two coils B of thin wire which polarize the piece A proportionally to the volts of the network. The piece A is suspended by a rod $b$ from a fixed point $c$. The current is conducted by two fine wires, not shown, which are brought in at the point of suspension.

The coils B B are wound in such a manner as to produce a consequent pole on the portion $z$ of the piece of soft iron A; $a$ and $a'$ constitute the other poles of opposite signs to that of the portion $z$, pole $a$ serves to maintain the oscillation of the system by reacting on the stationary coil C and the pole $a'$ serves to make the contact through a small auxiliary pendulum suspended at $c'$ and having as its bob a copper ring $d$. The rod $b'$ of this pendulum carries two springs $r$ $r'$ so situated that they alternately come into contact with the terminals $v$ $v'$ to produce the effects next to be described.

Contacts $v$ and $r$ being normally together, as soon as current is turned on in the apparatus, the fixed coil C attracts the pole $a$ of the piece A, for the coil C is in the circuit and is connected with $v$. The ring of copper $d$ being subject to the magnetic friction or damping due to the other pole $a'$ which moves within the ring without touching it maintains the contact with the terminal $v$ during the semi-oscillation of the system from left to right. On the return swing the auxiliary pendulum, being carried forward by the main pendulum, breaks contact at $v$ and closes another circuit by bringing together $v'$ and $r'$. The movement which is started automatically then continues, the full amplitude of the main pendulum being attained when the energy which it receives at each oscillation owing to the reaction of the coil C is equal to that lost owing to friction with the air and the damping produced by the copper ring $d$.

If a current proportional to the amperes passes through the fixed coil D so as to attract the magnet $z$, the period of an oscillation will be diminished, that is to say the pendulum will perform a greater number of oscillations per day. The opposite result will prevail if the action of the coil D on the magnet $z$ is repulsion.

Fig. 3, which shows the two pendulums of the meter combined with the rotary field motor, indicates the function of the contact between the terminal $v'$ and the spring $r'$. In this figure the right hand pendulum determines by means of the terminal $v'$ the current in the opposite windings $e$ $e$ of the stator of a small rotary field motor, so also the terminal $v'$ of the left hand pendulum transmits intermittent currents through the windings $e'$ $e'$ of the stator situated at right angles to the windings $e$ $e$. The intermittent currents transmitted through the agency of one of the pendulums are represented on line $I'$ of Fig. 4; these give rise to short induced currents $i'$ indicated on line N of the said figure in the rotor R at the very moment when the latter is in the magnetic field H H provided by the windings controlled by the other pendulum indicated in line I of the said figure. It is the reaction of these induced currents in the rotor R upon the stationary windings of the stator which determine the rotation of the motor; the rotation will occur when the two fields are ¼ of a period out of phase and the direction of the rotation will be determined by the pendulum which transmits the first wave. Assuming that this pendulum is the right hand one, the rotation will be in the direction of the hands of a watch, if it is the left hand pendulum the direction will be in the inverse of this. Between these two positions the rotor will not be subject to any force.

The arm $m$ fixed to the rotor R is free to move between two stops $k$ $k'$ and thus permits rotation of the rotor R, within these limits; so long as the right hand pendulum transmits the first current wave through the stator the arm $m$ remains in contact with the stop $k$. Assuming that this right hand pendulum is retarded the two waves are transmitted at the same instant and when the left hand pendulum is accelerated as compared with the right hand pendulum the rotation changes in direction, that is to say the arm $m$ is brought against the stop $k'$. It is these alternating movements produced at each new coincidence of the two pendulums which actuate by a pawl fixed to the arm $m$ a ratchet wheel $m'$ for integrating the movements. Now the excess of the number of oscillations of one pendulum over the other, equal to the number of the alternate movements of the rotor is proportional to the reaction of the fixed coils D D through which passes a current proportional to the amperes upon the magnets $z$ $z$ which are energized in proportion to the volts. Thus the indications of the integrators are proportional to the watts-hours.

It is to be understood that known devices which have hitherto been used in the attempt to suppress or to diminish running light may be used in the meter according to this invention, although the need of them is much less felt than in the older apparatus because the meter may be stopped during the period when no current is being used.

Having thus described the nature of my said invention and the best means I know of carrying the same into practical effect, I claim:—

1. A pendulum electricity meter comprising in combination two substantially frictionless electric pendulums having metallic connections at their points of suspension only, an auxiliary pendulum to each of the said pendulums, mechanism whereby the auxiliary pendulum is oscillated by the main pendulum without contact therewith, contacts adapted to be closed by the said auxiliary pendulum during its oscillations and mechanism whereby the oscillations of the main pendulum are maintained owing to current traversing the said contacts, substantially as described.

2. A pendulum electricity meter comprising in combination two electric pendulums adapted to be started automatically, an auxiliary pendulum to each of the said pendulums, mechanism whereby the said auxiliary pendulum is oscillated by the main pendulum without contact therewith, contacts adapted to be closed by the said auxiliary pendulum during its oscillations, mechanism whereby the oscillations of the main pendulum are maintained by current traversing the said contacts, a small rotary field motor, means for transmitting to the stator thereof current impulses from both pendulums and an integrating registering device connected with the rotor of the said motor.

3. In an electricity meter having current-actuated pendulums, a magnet pole carried by each of said pendulums, a ring of good conducting material adapted to form a closed circuit about each of said poles and to give rise to a magnetic damping due to the displacement of the magnet poles in the rings, and mechanism controlled by said damping to close the circuits of the currents which actuate the pendulums.

4. In a pendulum electricity meter, a magnetic device comprising a suspended curved piece of soft iron, coils of fine wire carried by the said piece, connections bridging said coils across the mains of the circuit so as to cause a current therein proportional to the volts of the circuit, the said coils being wound so as to produce a consequent pole in the portion of the said piece comprised between the coils, and a coil D in position to influence said portion and traversed by a current proportional to the amperes, substantially as described.

5. In a pendulum electricity meter, a magnetic device comprising a suspended curved piece of soft iron, coils of fine wire carried by the said piece, connections bridging said coils across the mains of the circuit so as to cause a current therein proportional to the volts of the circuit, the said coils being wound so as to produce a consequent pole in the portion of the said piece comprised between the coils, a fixed coil C surrounding without touching one of the poles of the said piece and means for passing currents through said coil C to maintain the movements of the pendulum, substantially as described.

6. In a pendulum electricity meter, a magnetic device comprising a suspended curved piece of soft iron, coils of fine wire carried by the said piece, connections bridging said coils across the mains of the circuit so as to cause a current therein proportional to the volts of the circuit, the said coils being wound so as to produce a consequent pole in the portion of the said piece comprised between the coils, a fixed coil C surrounding without touching one of the poles of the said piece, means for closing the circuit through said coil to maintain the movements of the pendulum, said means including an auxiliary pendulum and a ring of copper forming a bob of said auxiliary pendulum and adapted for the other pole of the said piece to extend through it, substantially as described.

In witness whereof, I have hereunto signed my name in the presence of two subscribing witnesses.

CHARLES FÉRY.

Witnesses:
H. C. COXE,
GABRIEL BELLIARD.